US012332076B2

(12) United States Patent
Homma et al.

(10) Patent No.: US 12,332,076 B2
(45) Date of Patent: Jun. 17, 2025

(54) ROAD SURFACE INFORMATION PROVIDING APPARATUS AND VEHICLE CONTROL APPARATUS

(71) Applicant: SUBARU CORPORATION, Tokyo (JP)

(72) Inventors: Takuya Homma, Tokyo (JP); Tsukasa Mikuni, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 318 days.

(21) Appl. No.: 17/829,845

(22) Filed: Jun. 1, 2022

(65) Prior Publication Data
US 2022/0397414 A1    Dec. 15, 2022

(30) Foreign Application Priority Data
Jun. 15, 2021  (JP) .................................. 2021-099144

(51) Int. Cl.
*G01C 21/36* (2006.01)
*G01C 21/00* (2006.01)

(52) U.S. Cl.
CPC ..... *G01C 21/3691* (2013.01); *G01C 21/3815* (2020.08); *G01C 21/3841* (2020.08)

(58) Field of Classification Search
CPC ............ G01C 21/3691; G01C 21/3815; G01C 21/3841; G01C 21/3697; G01C 21/3822;
(Continued)

(56) References Cited

U.S. PATENT DOCUMENTS

| 10,482,787 B2* | 11/2019 | Wrobel ................... G01C 21/34 |
| 2003/0038714 A1 | 2/2003 | Matsumoto et al. |
| 2022/0306154 A1* | 9/2022 | Fei ..................... B60W 60/0027 |

FOREIGN PATENT DOCUMENTS

| JP | H05-266399 A | 10/1993 |
| JP | 2002-008198 A | 1/2002 |

(Continued)

OTHER PUBLICATIONS

Notice of Reasons for Refusal received in Japanese Patent Application No. 2021-099144, dated Jan. 7, 2025.

*Primary Examiner* — Scott A Reinbold
(74) *Attorney, Agent, or Firm* — Rimon P.C.

(57) ABSTRACT

A road surface information providing apparatus includes an information acquisition unit, a road surface condition estimation unit, a risk map generation unit, and a transmission unit. The information acquisition unit acquires vehicle information from at least one vehicle with a wheel detected as being idling among vehicles that are traveling in a predetermined region, and acquire weather information about a surrounding area around the at least one vehicle. The predetermined region includes the surrounding area around the at least one vehicle. The road surface condition estimation unit generates road surface information about an estimated condition of a road surface in the predetermined region on the basis of the vehicle information and the weather information. The risk map generation unit generates a risk map in which the road surface information is correlated with map information. The transmission unit transmits the risk map to the vehicles traveling in the predetermined region.

2 Claims, 8 Drawing Sheets

(58) Field of Classification Search
CPC .......... G01C 21/3889; B60W 2555/20; B60W 2556/50; B60W 40/06
USPC .......................................................... 701/41
See application file for complete search history.

(56) References Cited

FOREIGN PATENT DOCUMENTS

| | | |
|---|---|---|
| JP | 2002-019489 A | 1/2002 |
| JP | 2003-187371 A | 7/2003 |
| JP | 2011-146065 A | 7/2011 |
| JP | 2012-038006 A | 2/2012 |
| JP | 2020-044939 A | 3/2020 |

* cited by examiner

| DANGER LEVEL | NOTIFICATION METHOD |
|---|---|
| LOW | DISPLAY |
| MIDDLE | DISPLAY AND ALARM |
| HIGH | DISPLAY, ALARM, SEAT VIBRATION |

FIG. 3A

| DANGER LEVEL | DANGER AVOIDANCE OPERATION | DRIVE ASSISTANCE INFORMATION / SLIP INFORMATION |
|---|---|---|
| LOW | — | PRESENCE OF SLIPPERY POINT AND POSITION ON MAP |
| MIDDLE | URGE DRIVER TO DECELERATE VEHICLE | DISTANCE AND ARRIVAL TIME TO SLIPPERY POINT |
| HIGH | URGE DRIVER TO MAKE COURSE CHANGE | DISTANCE AND ARRIVAL TIME TO SLIPPERY POINT AND RANGE OF SLIPPERY POINT |

FIG. 3B

ROAD SURFACE INFORMATION PROVIDING APPARATUS AND VEHICLE CONTROL APPARATUS

CROSS-REFERENCE TO RELATED APPLICATIONS

The present application claims priority from Japanese Patent Application No. 2021-099144 filed on Jun. 15, 2021, the entire contents of which are hereby incorporated by reference.

BACKGROUND

The technology relates to a road surface information providing apparatus and a vehicle control apparatus.

A technique for controlling a vehicle in accordance with a road surface condition has been known. For example, Japanese Unexamined Patent Application Publication (JP-A) No. 2002-19489 discloses a vehicle speed control apparatus that lowers an upper vehicle speed limit used in vehicle control as a road surface friction coefficient determined by an own vehicle or another vehicle decreases. Additionally, JP-A No. 2020-44939 discloses a vehicle control system that distributes a driving force to the wheels of an own vehicle on the basis of position information on the own vehicle, an estimated μ value of a road surface measured by a laser radar, and unevenness of the road surface retrieved from road surface information received from another vehicle.

SUMMARY

An aspect of the technology provides a road surface information providing apparatus including an information acquisition unit, a road surface condition estimation unit, a risk map generation unit, and a transmission unit. The information acquisition unit is configured to acquire vehicle information from at least one vehicle with a wheel detected as being idling while the at least one vehicle is traveling among vehicles that are traveling in a predetermined region, and acquire weather information about a surrounding area around the at least one vehicle. The predetermined region includes the surrounding area around the at least one vehicle. The road surface condition estimation unit is configured to generate road surface information about an estimated condition of a road surface in the predetermined region on the basis of the vehicle information and the weather information. The risk map generation unit is configured to generate a risk map in which the road surface information is correlated with map information. The transmission unit is configured to transmit the risk map to the plurality of vehicles traveling in the predetermined region.

An aspect of the technology provides a vehicle control apparatus to be mounted in a vehicle. The vehicle control apparatus includes a risk map acquisition unit, a danger level acquisition unit, and a notification control unit. The risk map acquisition unit is configured to acquire a risk map in which map information is correlated with road surface information about an estimated condition of a road surface in a predetermined region. The predetermined region includes a surrounding area around the vehicle. The danger level acquisition unit is configured to acquire the level of danger in a slippery region present in a traveling direction of the vehicle on a traveling road on the basis of the risk map and a traveling state of the vehicle. The notification control unit is configured to cause a notification unit to notify a driver who drives the vehicle of drive assistance information about a driving operation for avoiding the danger in the slippery region in accordance with the level of danger.

An aspect of the technology provides a road surface information providing apparatus including circuitry. The circuitry is configured to acquire vehicle information from at least one vehicle with a wheel detected as being idling while the at least one vehicle is traveling among vehicles that are traveling in a predetermined region, acquire weather information about a surrounding area around the at least one vehicle, generate road surface information about an estimated condition of a road surface in the predetermined region on the basis of the vehicle information and the weather information, generate a risk map in which the road surface information is correlated with map information, and transmit the risk map to the plurality of vehicles traveling in the predetermined region. The predetermined region includes the surrounding area around the at least one vehicle.

An aspect of the technology provides a vehicle control apparatus to be mounted in a vehicle. The vehicle control apparatus includes circuitry configured to acquire a risk map in which map information is correlated with road surface information about an estimated condition of a road surface in a predetermined region, acquire a level of danger in a slippery region present in a traveling direction of the vehicle on a traveling road on the basis of the risk map and a traveling state of the vehicle, and notify a driver who drives the vehicle of drive assistance information about a driving operation for avoiding the danger in the slippery region in accordance with the level of danger. The predetermined region includes a surrounding area around the vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 3A is an explanatory diagram illustrating an exemplary relationship between danger levels and notification methods defined for the vehicle control apparatus according to one example embodiment of the technology in accordance with the danger levels.

FIG. 3B is an explanatory diagram illustrating an exemplary relationship between the danger levels and drive assistance information defined for the vehicle control apparatus according to one example embodiment of the technology in accordance with the danger levels.

DETAILED DESCRIPTION

Figure 1:
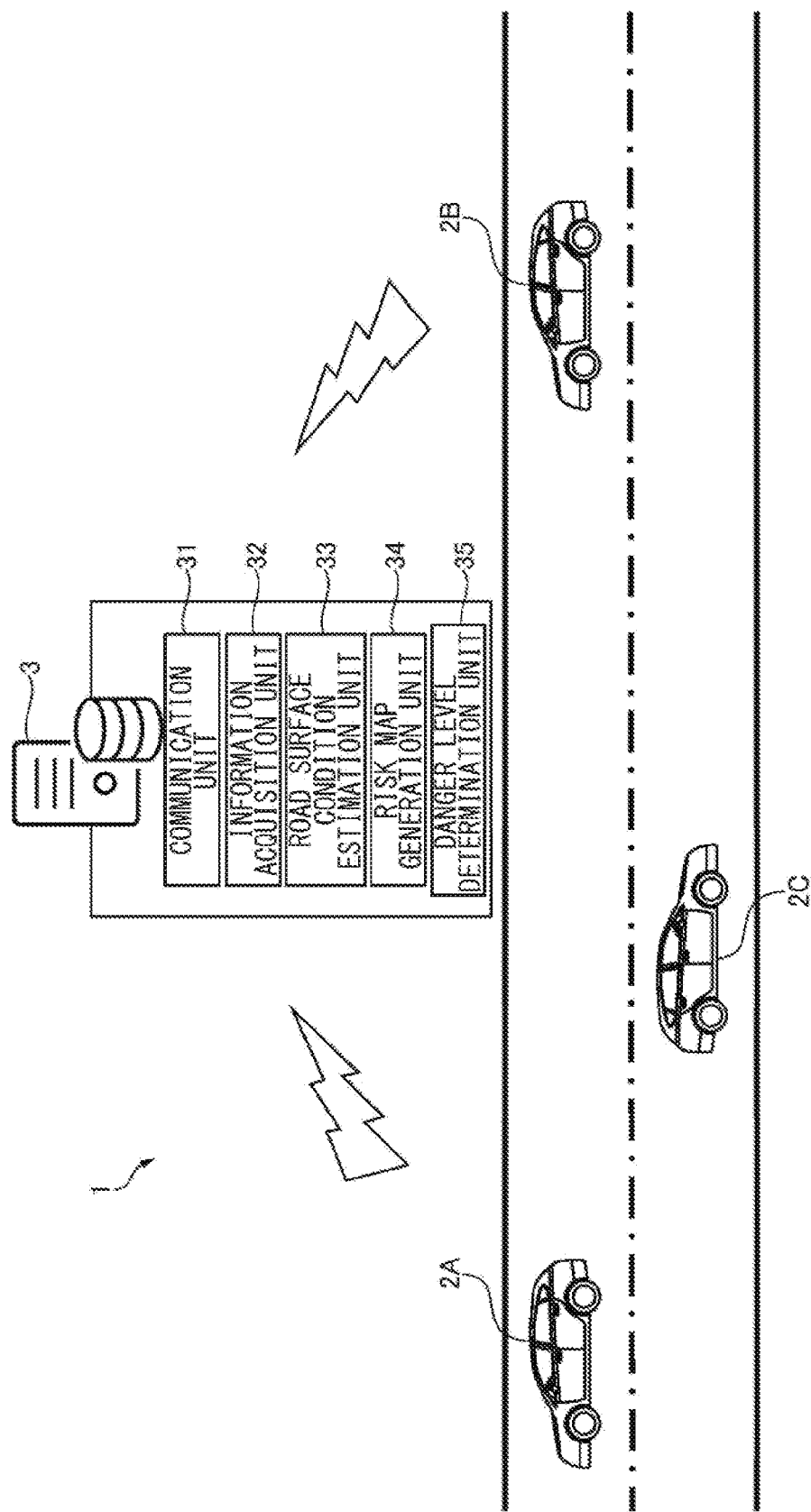
FIG. 1 is an explanatory diagram schematically illustrating an exemplary configuration of a vehicle control assist system including a road surface information providing apparatus and a vehicle control apparatus according to one example embodiment of the technology.

The road surface condition may change depending on environment conditions including weather conditions. For example, the road surface may be slippery due to rain or snow. In this case, it is desired to preliminarily recognize detailed conditions of each road surface, e.g., a slippery point, a lane line, the degree of slipperiness of the road surface, to perform appropriate vehicle control.

The degree of slipperiness of the road surface may be estimated on the basis of a weather forecast to an extent. However, the detailed conditions of each road surface described above are difficult to be estimated on the basis of the weather forecast, which covers a relatively large region. This makes it difficult to accurately recognize the detailed road surface conditions while the vehicle is traveling. Accordingly, it is difficult to perform appropriate driving operation or vehicle control in accordance with the road surface condition.

Example embodiments of the technology addresses these concerns. That is, it is desirable to estimate the detailed conditions of each road surface to assist a driving operation in accordance with the road surface condition and achieve appropriate assistance to vehicle control.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

According to an example embodiment of the technology, a vehicle control apparatus 21 to be mounted in a vehicle 2 and a road surface information providing apparatus 3 may serve as parts of a vehicle control assist system 1. That is, the vehicle control assist system 1 may include the vehicle control apparatus 21 mounted in the vehicle 2, and the road surface information providing apparatus 3 that sends/receives various kinds of information to/from the vehicle control apparatus 21.

In an example illustrated in FIGS. 1 and 2, the road surface information providing apparatus 3 may communicate with the vehicle control apparatus 21 mounted in each of vehicles 2A, 2B, and 2C (hereinafter simply referred to as vehicle(s) 2 unless specific differentiation is needed) to acquire vehicle information from the vehicle control apparatus 21 mounted in each of the vehicles 2. On the basis of the vehicle information received from each of the vehicle control apparatuses 21, the road surface information providing apparatus 3 may generate information indicating a road surface condition, and provide the generated information to the vehicle control apparatus 21 of each of the vehicles 2.

As illustrated in FIG. 1, the road surface information providing apparatus 3 may include a communication unit 31, an information acquisition unit 32, a road surface condition estimation unit 33, a risk map generation unit 34, and a danger level determination unit 35. The communication unit 31 may communicate with the vehicles 2 that are traveling, a weather information providing server (not illustrated) administrated by a private or official organization, and other predetermined information providing servers to send and receive various kinds of information. In one embodiment, the communication unit 31 may serve as a "transmission unit".

The information acquisition unit 32 acquires the vehicle information at least from the vehicle 2 with a wheel detected as being idling among the plurality of vehicles 2 via the communication unit 31. The vehicle information may include position information and travel information. The position information may indicate a traveling position where the idling of the wheel of the vehicle 2 is detected, and the travel information may indicate a traveling state of the vehicle 2. The travel information may include information about, for example, a vehicle speed, wheel idling information, a road surface μ value that is a friction coefficient of a road surface on which the vehicle 2 detected as being idling is traveling, the turning amount of a steering wheel, an operational state of a windshield wiper, a traveling mode, and a traveling route to, for example, a set destination. The vehicle information may further include information about a surrounding environment such as ambient temperature acquired by the vehicle 2.

The information acquisition unit 32 may acquire observation information from each vehicle 2 or the weather information providing server via the communication unit 31. The observation information may include information about, for example, current weather, ambient temperature, the amount of rainfall, and the amount of snowfall in an area including a traveling position of the vehicle 2 (i.e., a surrounding area around the vehicle 2).

The road surface condition estimation unit 33 generates road surface information on the basis of the vehicle information and the weather information acquired by the information acquisition unit 32. The road surface information may be information about an estimated condition of a road surface in a predetermined region including the surrounding area around the vehicle 2 that is traveling.

For example, the road surface condition estimation unit 33 may estimate the position of a traveling road including a slippery region on the map on the basis of the position information on the vehicle 2. The road surface condition estimation unit 33 may further estimate a slippery point of the traveling road by identifying the position of the idling wheel (e.g., a right front wheel, a left front wheel, a right rear wheel, or a left rear wheel as viewed in a traveling direction) of the vehicle 2 on the basis of the wheel idling information on the vehicle 2. The road surface condition estimation unit 33 may further estimate the degree of slipperiness at the slippery point on the basis of the road surface μ value of the position on the traveling road where the wheel of the idling of the wheel of the vehicle 2 is detected.

When receiving the vehicle information from each of the vehicles 2, the road surface condition estimation unit 33 may identify, for example, the slippery region of the traveling road, the range of the slippery region, and the number of vehicles slipped in the slippery region on the basis of the information about the slippery point received from each of the vehicles 2. The slippery region may cover, for example, the entire width of the traveling road, only a certain traveling lane of the traveling road, or the right or left portion of a certain traveling lane of the traveling road. Accordingly, the road surface condition estimation unit 33 makes it possible to accurately estimate the road surface condition.

The road surface condition estimation unit 33 may include the results of the estimation described above, i.e., slip information about the traveling road with the slippery region (slippery point), the range of the slippery region of the traveling road, and the degree of slipperiness, in the road surface information. The road surface condition estimation unit 33 may also estimate the surrounding environment of the vehicle 2 on the basis of the weather information and the observation information. On the basis of the estimated surrounding environment of the vehicle 2, the road surface condition estimation unit 33 may estimate a condition of the road surface several ten minutes or several hours later, and include the information about the estimated future road surface condition in the road surface information.

The risk map generation unit 34 generates a risk map in which map information is correlated with the road surface information. That is, the risk map generation unit 34 may generate the risk map by overlaying the road surface information including the same position information as that of the map information on the map information, for example. The overlapping may be performed by means of characters, numbers, or images, as appropriate.

This risk map may serve as a map that allows an occupant of the vehicle 2 to intuitively recognize the road surface condition. After receiving the risk map, the vehicle 2 may display the risk map on a display provided in the vehicle 2 to notify the driver or occupant of the slippery region present on the traveling road or an adjacent traveling road, if any.

The map information may be preliminarily stored in a non-illustrated memory provided in the road surface information providing apparatus 3. Alternatively, the map information may be acquired from an external map information administrative server via the communication unit 31, as needed. A more detailed risk map may be generated by using high-definition three-dimensional map information, such as a dynamic map, as the map information. The generated risk map may be sent by the communication unit 31 to the vehicle 2.

The danger level determination unit 35 may identify vehicles 2 traveling on the risk map, and determine a danger level of each of the vehicles 2. The danger level may indicate the degree of danger of each of the vehicles 2 traveling on the risk map in the traveling direction. The danger level may be defined in multiple levels, for example, three levels: a high level, a middle level, and a low level. The danger level may be determined on the basis of, for example, the presence or absence of the slippery region (slippery point) in the traveling direction of the vehicle 2 on the risk map, and if present, the range of the slippery point, the distance from the vehicle 2 to the slippery point, and the number of vehicles slipped at the slippery point. The results of determination, i.e., the danger level of each vehicle 2 may be sent to the corresponding vehicle 2 via the communication unit 31.

Note that the danger level may not be necessarily determined by the road surface information providing apparatus 3. Alternatively, the danger level of the vehicle 2 may be determined by the vehicle 2 itself when receiving the risk map.

In the following, an example of the vehicle control apparatus 21 is described. The vehicle control apparatus 21 provided in the vehicle 2 may be coupled to various electronic devices (described below) that are necessary for traveling of the vehicle 2. The vehicle control apparatus 21 may include a plurality of in-vehicle electronic control units (ECUs) that control these electronic devices. These electronic devices and the in-vehicle ECUs may be communicably coupled to each other via an in-vehicle network, such as a controller area network (CAN) or a local interconnect network (LIN).

The in-vehicle ECU may include, for example, a processor such as a central processing unit (CPU) or a micro processing unit (MPU), electric circuitry, and a storage device such as a random access memory (RAM) or a read only memory (ROM). The operation of the in-vehicle ECU may be entirely or partially implemented by hardware such as an application specific integrated circuit (ASIC), a field-programmable gate array (FPGA), or a graphics processing unit (GPU). In the following, description and illustration are omitted of some of the electronic devices and some of the in-vehicle ECUs that are not directly related to a control operation of the vehicle control apparatus 21 in the vehicle 2 according to any example embodiment of the technology.

Figure 2:
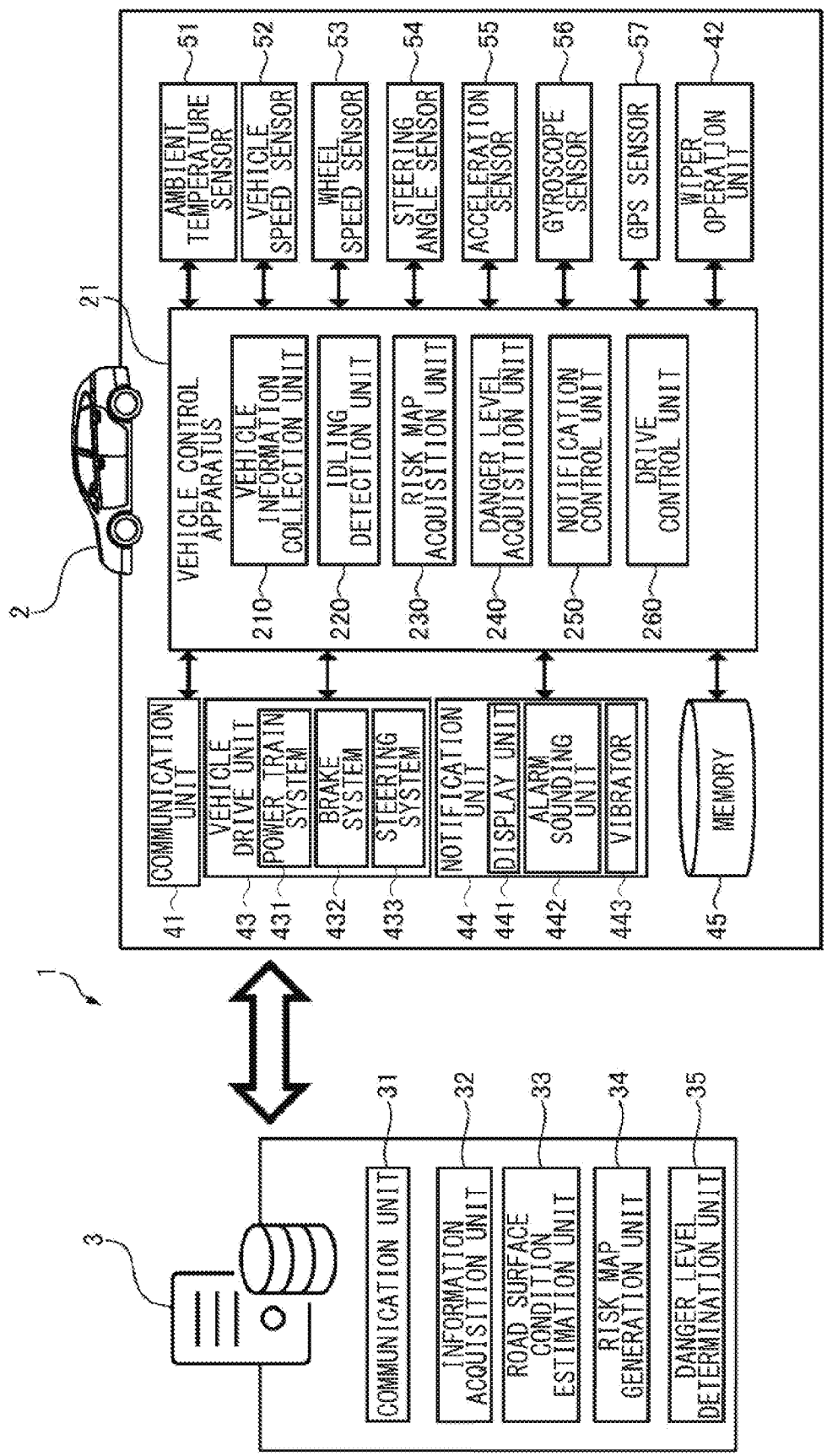
FIG. 2 is an explanatory diagram schematically illustrating an exemplary configuration of the vehicle control assist system including the road surface information providing apparatus and the vehicle control apparatus according to one example embodiment of the technology.

As described in FIG. 2, various vehicle drive systems and electronic devices that are necessary for traveling of the vehicle 2 may be coupled to the vehicle control apparatus 21 via an in-vehicle network. Examples of the vehicle drive systems and the electronic devices may include a communication unit 41, a wiper operation unit 42, a vehicle drive unit 43, a notification unit 44, a memory 45, an ambient temperature sensor 51, a vehicle speed sensor 52, a wheel speed sensor 53, a steering angle sensor 54, an acceleration sensor 55, a gyroscope sensor 56, and a GPS sensor 57. The vehicle drive unit 43 may include, for example, a power train system 431, a brake system 432, and a steering system 433. The notification unit 44 may include a display unit 441, an alarm sounding unit 442, and a vibrator 443.

The communication unit 41 may be an interface that sends and receives various kinds of information to/from an external server, such as the road surface information providing apparatus 3, or other vehicles. The wiper operation unit 42 may detect a rainfall amount and operate the wiper at a predetermined time interval on the basis of the detected rainfall amount, for example.

The vehicle drive unit 43 may include drive systems, such as the power train system 431, the brake system 432, and the steering system 433, as described above. The vehicle drive unit 43 is driven and controlled to perform a steering operation, an accelerating operation, a decelerating operation, a stopping operation, or other driving operations of the vehicle 2 in accordance with a control signal sent from the drive control unit 260.

The notification unit 44 may include the display unit 441, the alarm sounding unit 442, and the vibrator 443, as described above. The notification unit 44 may notify the driver who drives the vehicle 2 of drive assistance information by a method in accordance with the danger level under the control by a notification control unit 250. The drive assistance information may be information provided to the driver of the vehicle 2 in order to avoid danger.

The display unit 441 may include, for example, a display panel provided on a dashboard, and a head-up display (HUD) projecting an image on the front windshield. The display unit 441 may display an image visually recognizable by the occupant of the vehicle 2. In a case where the display unit 441 is a HUD, the display unit 441 may display a speed indication, a navigation image, and other images on the front windshield of the vehicle 2. In this way, the display unit 441 may provide various kinds of information to the occupant, in particular the driver, of the vehicle 2.

The display unit 441 may also display the slip information about the traveling direction of the vehicle 2 and the drive assistance information about the driving operation for avoiding danger to the driver or occupant of the vehicle 2 in a visually recognizable manner in accordance with a notification instruction from the notification control unit 250 of the vehicle control apparatus 21, to thereby urge the driver or occupant of the vehicle 2 to avoid the danger.

The alarm sounding unit 442 may include, for example, a general speaker. The alarm sounding unit 442 may output a sound or a predetermined alarm to notify the driver or occupant of the vehicle 2 of the presence of the information about the slippery point and the danger in the traveling direction in accordance with a notification instruction from the notification control unit 250. The alarm sounding unit 442 may not be necessarily a device dedicated to the notification. The alarm sounding unit 442 may also serve as a speaker of an in-vehicle audio device or a navigation system.

The vibrator 443 may include a seat vibrator and a steering wheel vibrator. The seat vibrator may vibrate a driver's seat on which the driver is seated. The steering wheel vibrator may vibrate the steering wheel. Vibrating the driver's seat or the steering wheel helps notify the driver of the drive assistance information and urges the driver to perform the driving operation for avoiding the danger.

As illustrated in FIGS. 3A and 3B, the memory 45 may store, for example, information necessary for operating the vehicle control apparatus 21, information to be sent by the communication unit 41, information received by the communication unit 41, the drive assistance information in accordance with danger levels described below, and notification methods in accordance with the danger levels.

Various sensors including the ambient temperature sensor 51, the vehicle speed sensor 52, the wheel speed sensor 53, the steering angle sensor 54, the acceleration sensor 55, the gyroscope sensor 56, and the GPS sensor 57 may detect a traveling state of the vehicle 2 on the basis of the characteristics of these sensors.

The vehicle control apparatus 21 may use the in-vehicle ECUs in the vehicle control apparatus 21 to implement a vehicle information collection unit 210, an idling detection unit 220, a risk map acquisition unit 230, a danger level acquisition unit 240, a notification control unit 250, and a drive control unit 260. The vehicle control apparatus 21 may control the above-described drive systems and electronic devices coupled to the vehicle control apparatus 21.

The vehicle information collection unit 210 may acquire, as the vehicle information on the vehicle 2, the vehicle speed, the position information, the wheel idling information, the road surface μ value, the turning amount of the steering wheel, the ambient temperature, the operational state of the wiper, the traveling route (to a set destination), and the traveling mode, for example.

The vehicle speed may refer to information about the traveling speed of the vehicle 2 obtained by monitoring an output from the vehicle speed sensor 52 in a predetermined cycle. The position information may refer to information about the position (including the latitude and the longitude) of the vehicle 2 determined on the basis of radio waves transmitted from the satellites of the global positioning system (GPS) to the GPS sensor 57 or an output from the gyroscope sensor 56.

The wheel idling information may refer to information about the revolution speed or the number of revolutions of each wheel of the vehicle 2 determined on the basis of an output sent from the wheel speed sensor 53 provided on each wheel of the vehicle 2 when idling is detected by the idling detection unit 220 described below.

The road surface μ value may refer to the friction coefficient of the traveling road surface on which the vehicle 2 is traveling. For example, the road surface μ value of the traveling road surface may be calculated in a predetermined cycle on the basis of the vehicle speed of the vehicle 2 detected by the vehicle speed sensor 52, the wheel revolution speed detected by the wheel speed sensor 53, and the steering wheel angle detected by the steering angle sensor 54.

The turning amount of the steering wheel may refer to information obtained on the basis of outputs from the steering angle sensor 54 and a non-illustrated steering torque sensor provided in the steering system 433, for example. The ambient temperature may refer to current temperature of the area in which the vehicle 2 is traveling. The ambient temperature may be obtained by monitoring an output from the ambient temperature sensor 51 in a predetermined cycle.

The operational state of the wiper may refer to information about an operation interval of the wiper, for example. The traveling route may refer to information about a traveling route from a departure point to a destination. The traveling route may be input by the occupant of the vehicle 2 using a predetermined input unit (not illustrated) or proposed by an external server in response to an input of a destination by the occupant.

The traveling mode serving as the vehicle information may refer to information identifying a traveling mode selected by the occupant from a plurality of traveling modes preliminarily set for the vehicle control apparatus 21 and used in the current traveling. As the traveling mode, predetermined responsiveness to an input operation may be set on the basis of a preference of the occupant, an environment or a condition of the traveling road, weather, or other factors. Examples of the traveling modes may include a comfort-focused mode, a sport traveling mode, and an energy-saving mode. In general, a plurality kinds of traveling modes may be set for each vehicle.

These pieces of vehicle information may be temporary stored in the memory 45, and may be transmitted by the communication unit 41 to the road surface information providing apparatus 3 when idling of a wheel is detected by the idling detection unit 220 described below. As described above, the road surface information providing apparatus 3 may collect the information about, for example, the slippery region of the road surface by referring to the position on the road surface where idling of the vehicle 2 occurred and the road surface μ value of the road surface on the basis of the vehicle information sent from the vehicle 2 to thereby generate the risk map.

The idling detection unit 220 may monitor the revolution speeds or the revolution numbers of all the rotating wheels of the vehicle 2 on the basis of an output from the wheel speed sensor 53 that is attached to each of the wheels of the vehicle 2 and detects the rotation of the corresponding wheel. In a case where the revolution speed or the revolution number of any of the wheels is extremely greater than those of the other wheels, the idling detection unit 220 may detect the wheel as being idling.

The risk map acquisition unit 230 may acquire the risk map from the road surface information providing apparatus 3 via the communication unit 41. In the risk map, the map information may be correlated with the road surface information about the estimated condition of the road surface in a predetermined region including the surrounding area around the own vehicle (i.e., the corresponding vehicle 2), as described above. The vehicle control apparatus 21 may cause the display unit 441 to display the risk map to thereby allow the driver to intuitively recognize the road surface condition, e.g., whether there is a slippery region of the road surface in the displayed map in the traveling direction of the vehicle 2.

The danger level acquisition unit 240 may receive and acquire the risk map and the danger level of the vehicle 2 from the road surface information providing apparatus 3. In a case where the danger level acquisition unit 240 does not receive the danger level from the road surface information providing apparatus 3, the danger level acquisition unit 240 may determine, on the basis of the risk map, the danger level indicating the degree of danger of the own vehicle (i.e., the corresponding vehicle 2) traveling on the road surface in the traveling direction.

For example, the danger level acquisition unit 240 may identify the slippery region (slippery point) present in the traveling direction of the vehicle 2 by referring to the risk map, estimate the range and degree of slipperiness of the identified slippery region, and determine the danger level on the basis of multiple (e.g., three) levels. The determination of the danger level by the danger level acquisition unit 240 may be performed in a similar manner to the determination of the danger level by the road surface information providing apparatus 3 described above.

Now, a description is given of an example of the determination of the danger level by the danger level acquisition unit 240. For example, the danger level acquisition unit 240 may determine whether there is a slippery point in the traveling direction of the vehicle 2 by referring to the risk map. If there is no slippery point, the danger level may be determined as being "low".

The danger level acquisition unit 240 may determine whether there is a slippery point, and if any, whether the distance from the own vehicle (i.e., the corresponding vehicle 2) to the slippery point is less than a predetermined distance, or whether an estimated arrival time to the slippery point is less than a predetermined time if the vehicle 2 travels at a current vehicle speed. If the distance to the slippery point is greater than or equal to the predetermined distance or if the estimated arrival time to the slippery point is greater than or equal to the predetermined time, the danger level may be determined as being "middle".

Further, if the distance to the slippery point or the estimated arrival time to the slippery point is less than or equal to the predetermined distance or the predetermined time, and if the number of vehicles slipped at the slippery point is less than a predetermined number, the danger level acquisition unit 240 may determine the danger level as being "middle". Furthermore, if the distance to the slippery point or the estimated arrival time to the slippery point is less than or equal to the predetermined distance or the predetermined time and if the number of vehicles slipped at the slippery point is greater than or equal to the predetermined number, the danger level acquisition unit 240 may determine the danger level as being "high".

The notification control unit 250 may cause the notification unit 44 to notify the driver who drives the own vehicle (i.e., the corresponding vehicle 2) of the driving operation for avoiding the danger at the slippery point, i.e., the drive assistance information including a danger avoidance operation, by a method in accordance with the danger level. That is, the notification control unit 250 may cause the notification unit 44 to notify the driver of the drive assistance information by different methods depending on the danger levels. As the danger level increases, the notification unit 44 may be controlled to notify the driver of the drive assistance information with higher intensity. This urges the driver to perform the driving operation for avoiding the danger with different intensities depending on the danger levels.

For example, if the danger level is "low", the notification control unit 250 may cause the display unit 441 to display the drive assistance information. If the danger level is "middle", the notification control unit 250 may cause the display unit 441 to display the drive assistance information and cause the alarm sounding unit 442 to notify the driver of the drive assistance information with a sound or an alarm. If the danger level is "high", the notification control unit 250 may cause the display unit 441 to display the drive assistance information in an enlarged manner, cause the alarm sounding unit 442 to output the sound or alarm at a higher volume, and cause the vibrator 443 to vibrate the seat vibrator or the steering wheel vibrator, for example.

These notification methods that differ depending on the danger levels may be stored in correlation with the respective danger levels in the memory 45, as illustrated in FIG. 3A.

The drive assistance information may include at least the danger avoidance operation against the slippery region. The drive assistance information may further include the slip information about, for example, the position of the slippery point, the distance from the vehicle 2 to the slippery point, the estimated arrival time to the slippery point, and the range of the slippery region.

The danger avoidance operation may include, for example, information about a traveling course change. In this case, the notification control unit 250 may cause the notification unit 44 to notify the driver of a recommendation to change the traveling course or a recommended traveling course after the traveling course change, for example. Note that the drive assistance information is not limited to the traveling course change. The drive assistance information to be provided to the driver may differ depending on the danger levels.

That is, the notification control unit 250 may cause the notification unit 44 to select the drive assistance information including the danger avoidance operation corresponding to the danger level of the vehicle 2 and notify the driver of the drive assistance information.

For example, the notification control unit 250 may cause the notification unit 44 to notify the driver of the drive assistance information as follows. If the danger level is "low", a driving operation to be performed to avoid the danger may not be determined. However, the notification unit 44 is controlled to notify the driver of the slip information indicating the presence of the slippery point and the position of the slippery point on the map.

If the danger level is "middle", the notification unit 44 is controlled to notify the driver of a recommendation to decelerate the vehicle 2 as the danger avoidance operation, and also notify the driver of the slip information indicating the presence of the slippery point, the distance to the slippery point, and the estimated arrival time to the slippery point.

If the danger level is "high", the notification unit 44 is controlled to notify the driver of a recommendation to make a traveling course change (including a lane change) as the danger avoidance operation, and also notify the driver of the slip information indicating the presence of the slippery point, the distance to the slippery point, and the estimated arrival time to the slippery point.

As described above, the vehicle control apparatus 21 makes it possible to determine the danger avoidance operation in accordance with the danger level, and the slip information to be presented. As illustrated in FIG. 3B, for example, the danger avoidance operations and the slip information may be preliminarily stored in correlation with the danger levels in the memory 45, or may be determined by the danger level acquisition unit 240 on an as-needed basis. Alternatively, the danger avoidance information and the slip information may be received from the road surface information providing apparatus 3.

The drive control unit 260 may control driving of the vehicle 2 by controlling a steering operation, an accelerating operation, a decelerating operation, a stopping operation, or other driving operations of the vehicle drive unit 43.

(Processing Performed by Road Surface Information Providing Apparatus and Vehicle Control Apparatus)

Hereinafter, a descriptions is given of processing performed by the road surface information providing apparatus 3 and processing performed by the vehicle control apparatus 21.

Figure 4:
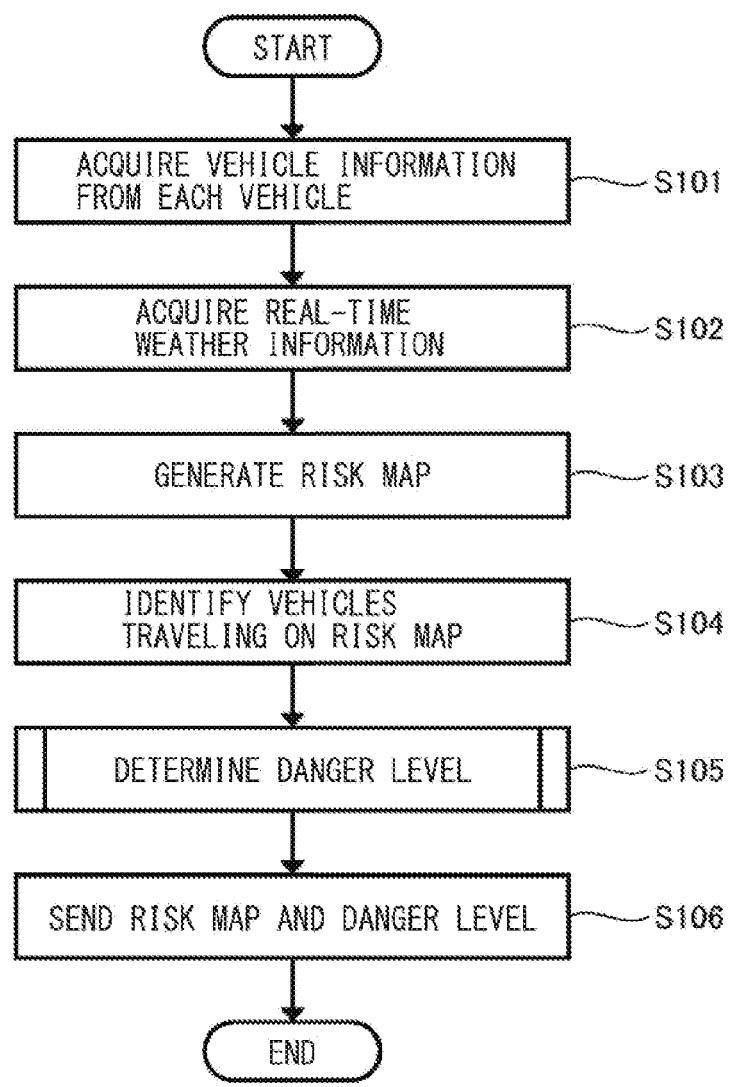
FIG. 4 is a flowchart illustrating an exemplary flow of processing performed by the road surface information providing apparatus according one example embodiment of the technology to generate a risk map.

First, an exemplary flow of the processing performed by the road surface information providing apparatus 3 to generate the risk map is described with reference to the flowchart illustrated in FIG. 4. The information acquisition unit 32 in the road surface information providing apparatus 3 may acquire the vehicle information from the vehicle control apparatus 21 provided in the vehicle 2 with a wheel detected as being idling via the communication unit 31 among a plurality of vehicles 2 that are traveling (Step S101). The information acquisition unit 32 may further acquire real-time weather information on a predetermined region including a surrounding area around the vehicle 2 from the vehicle 2 or the weather information providing server (Step S102).

Thereafter, the risk map generation unit 34 may generate the risk map (Step S103). Prior to the generation of the risk map, the road surface condition estimation unit 33 may generate the road surface information on the basis of the vehicle information and the weather information received from the plurality of vehicles 2. The road surface information may include the slip information indicating an estimated condition of a road surface in the predetermined region including the surrounding area around the vehicle 2 that is traveling. The risk map generation unit 34 may correlate the road surface information with the map information to generate the risk map in which the road surface information is overlaid on the map information (Step S103).

The danger level determination unit 35 may identify the vehicles 2 traveling on the risk map (Step S104), and determines the danger level of each of the vehicles 2 in the traveling direction of the vehicle 2 (Step S105). The determination of the danger level is to be described in detail later. The communication unit 31 may send the risk map generated by the risk map generation unit 34 and the danger level or the result of determination by the danger level determination unit 35 to each of the vehicles 2 (Step S106).

Next, an exemplary flow of the processing performed by the danger level determination unit 35 to determine the danger level is described with reference to the flowchart illustrated in FIG. 5. The danger level determination unit 35 may determine whether there is a slippery point in the traveling direction of the vehicle 2 that is traveling on the basis of the risk map (Step S201). If there is no slippery point (Step S201: NO), the danger level determination unit 35 may determine the danger level as being "low" (Step S202).

If there is a slippery point in the traveling direction of the vehicle 2 (Step S201: YES), the danger level determination unit 35 may determine whether the distance from the vehicle 2 to the slippery point is less than a predetermined distance or whether an estimated arrival time of the vehicle 2 to the slippery point is less than a predetermined time (Step S203). If the distance from the vehicle 2 to the slippery point present in the traveling direction of the vehicle 2 is greater than or equal to the predetermined distance or if the estimated arrival time of the vehicle 2 to the slippery point is greater than or equal to the predetermined time (Step S203: NO), the danger level determination unit 35 may determine the danger level as being "middle" (Step S204).

If the distance from the vehicle 2 to the slippery point present in the traveling direction of the vehicle 2 is less than the predetermined distance or if the estimated arrival time of the vehicle to the slippery point is less than the predetermined time (Step S203: YES), the danger level determination unit 35 may determine whether the number of vehicles slipped at the slippery point is greater than or equal to a predetermined number (Step S205). If the number of vehicles slipped at the slippery point is less than the predetermined number (Step S205: NO), the danger level determination unit 35 may determine the danger level as being "middle" (Step S206). If the number of vehicles slipped at the slippery point is greater than or equal to the predetermined number (Step S205: YES), the danger level determination unit 35 may determine the danger level as being "high" (Step S207).

Figure 5:
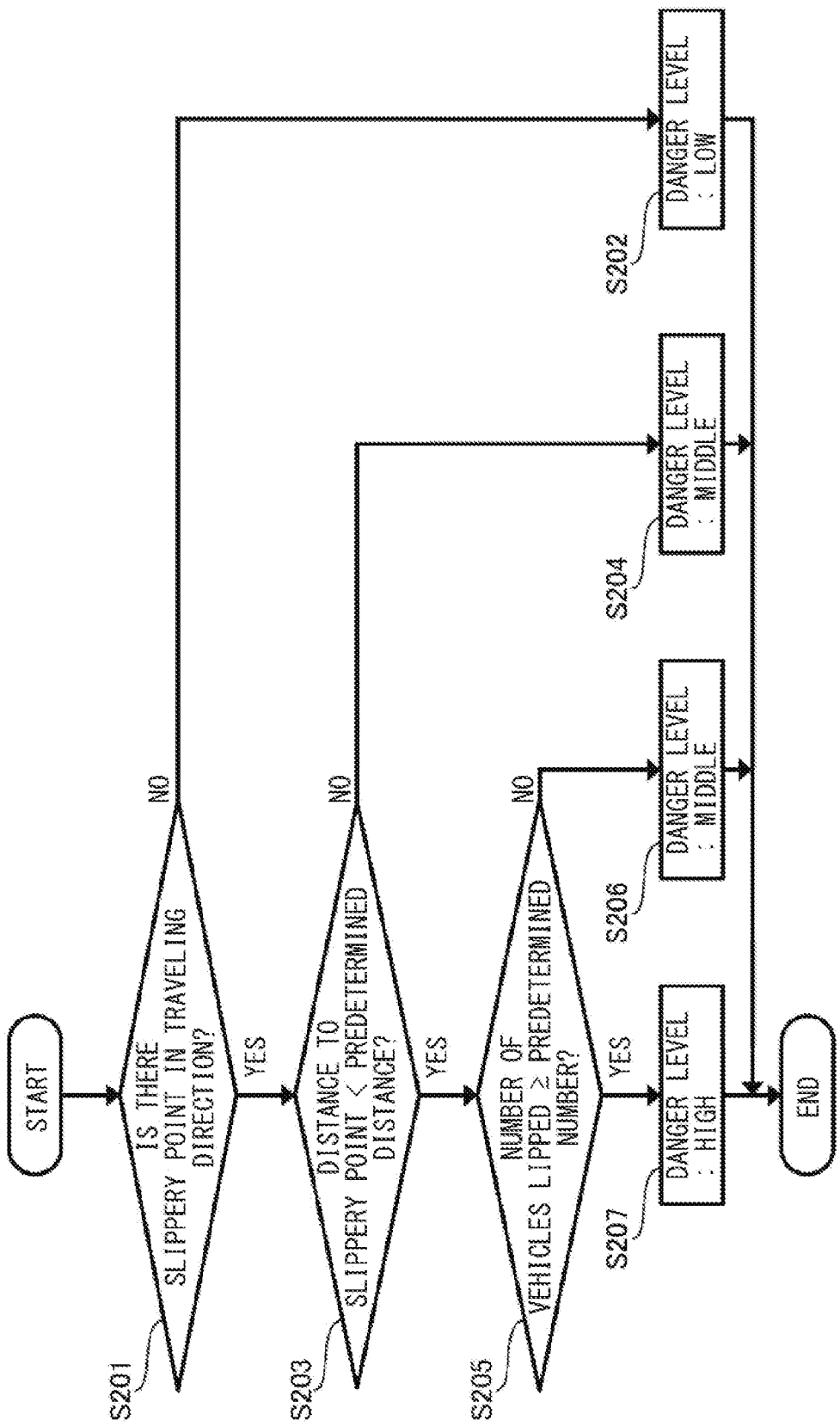
FIG. 5 is a flowchart illustrating an exemplary flow of processing performed by the road surface information providing apparatus according to one example embodiment of the technology to determine a danger level.

Note that the danger level acquisition unit 240 in the vehicle control apparatus 21 may determine the danger level in a similar manner as in the processing performed by the road surface information providing apparatus 3 to determine the danger level illustrated in FIG. 5.

Figure 6B:
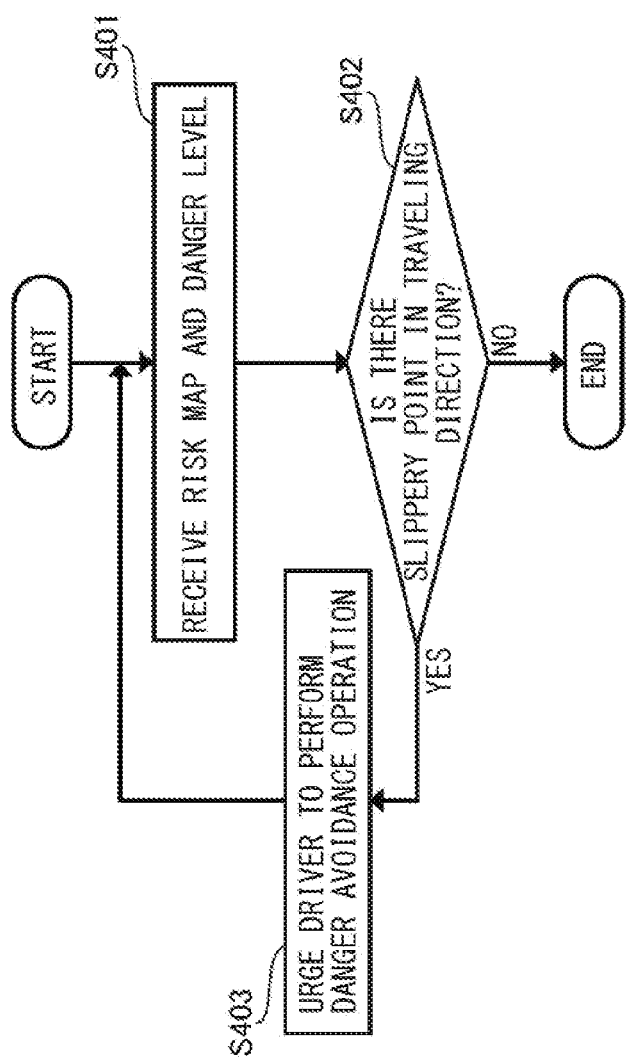
FIG. 6B is a flowchart illustrating an exemplary flow of processing performed after the risk map and the danger level are received.
Figure 6A:
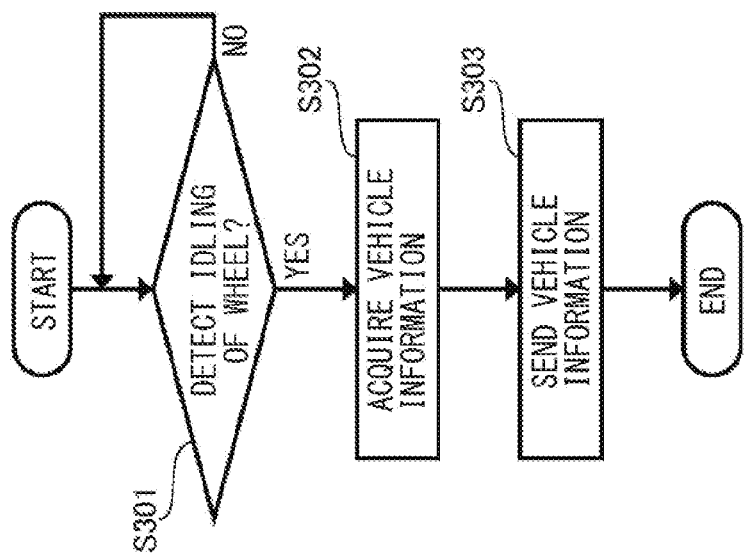
FIG. 6A is a flowchart illustrating an exemplary flow of processing performed by the vehicle control apparatus according to one example embodiment of the technology to send vehicle information.

Next, an exemplary flow of the processing performed by the vehicle control apparatus 21 is described with reference to the flowcharts illustrated in FIGS. 5, 6A, and 6B. FIG. 6A is a flowchart illustrating exemplary processing performed by the vehicle control apparatus 21 to send the vehicle information to the road surface information providing apparatus 3. FIG. 6B is a flowchart illustrating exemplary processing performed after the risk map and the danger level are received from the road surface information providing apparatus 3.

As illustrated in FIG. 6A, if the idling detection unit 220 in the vehicle control apparatus 21 detects idling of a wheel (Step S301: YES), the vehicle information collection unit 210 may acquire the vehicle information to be sent to the road surface information providing apparatus 3 from outputs from the sensors, and store the vehicle information in the memory 45 (Step S302). The vehicle information collection unit 210 may send the vehicle information collected from the sensors and stored in the memory 45 to the road surface information providing apparatus 3 via the communication unit 41 (Step S303).

As illustrated in FIG. 6B, the vehicle control apparatus 21 may receive the risk map and the danger level from the road surface information providing apparatus 3 (Step S401), and refer to the risk map. If there is a slippery point in the traveling direction of the own vehicle (i.e., the corresponding vehicle 2) (Step S402: YES), the vehicle control apparatus 21 may notify the driver of the drive assistance information in accordance with the danger level, to thereby urge the driver to avoid the danger (Step S403).

Figure 7:
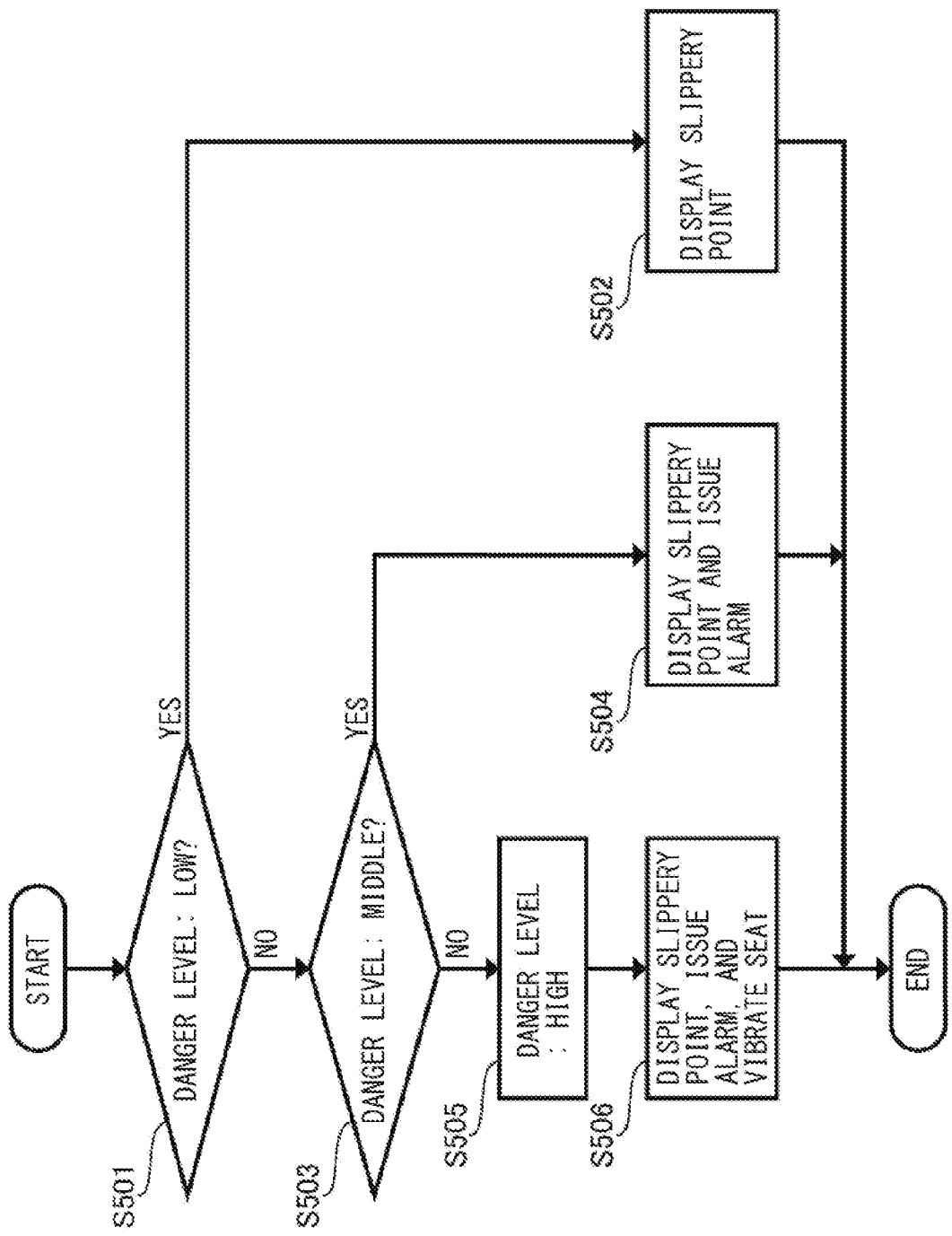
FIG. 7 is a flowchart illustrating an exemplary flow of notification processing performed by a vehicle control apparatus according to one example embodiment of the technology in accordance with the drive assistance information.

As illustrated in FIG. 7, the vehicle control apparatus 21 may notify the driver of the drive assistance information with different intensities depending on the danger levels. That is, if the danger level is "low" (Step S501: YES), the notification control unit 250 may cause the display unit 441 to display the slippery point or display the slippery point on the risk map with emphasis (Step S502).

If the danger level is "middle" (Step S503: YES), the notification control unit 250 may cause the display unit 441 to display the slippery point, and cause the alarm sounding unit 442 to notify the driver of the presence of the slippery point, the distance to the slippery point, and other pieces of information about the slippery point with an alarm or a sound (Step S504).

If the danger level is "high" (Step S505), the notification control unit 250 may cause the display unit 441 to display the slippery point, cause the alarm sounding unit 442 to issue an alarm, and cause the vibrator 443 to vibrate the driver's seat (Step S506). In addition to the notification of the slippery point, the danger avoidance operation in accordance with the danger level may be provided to the driver.

Figure 8:
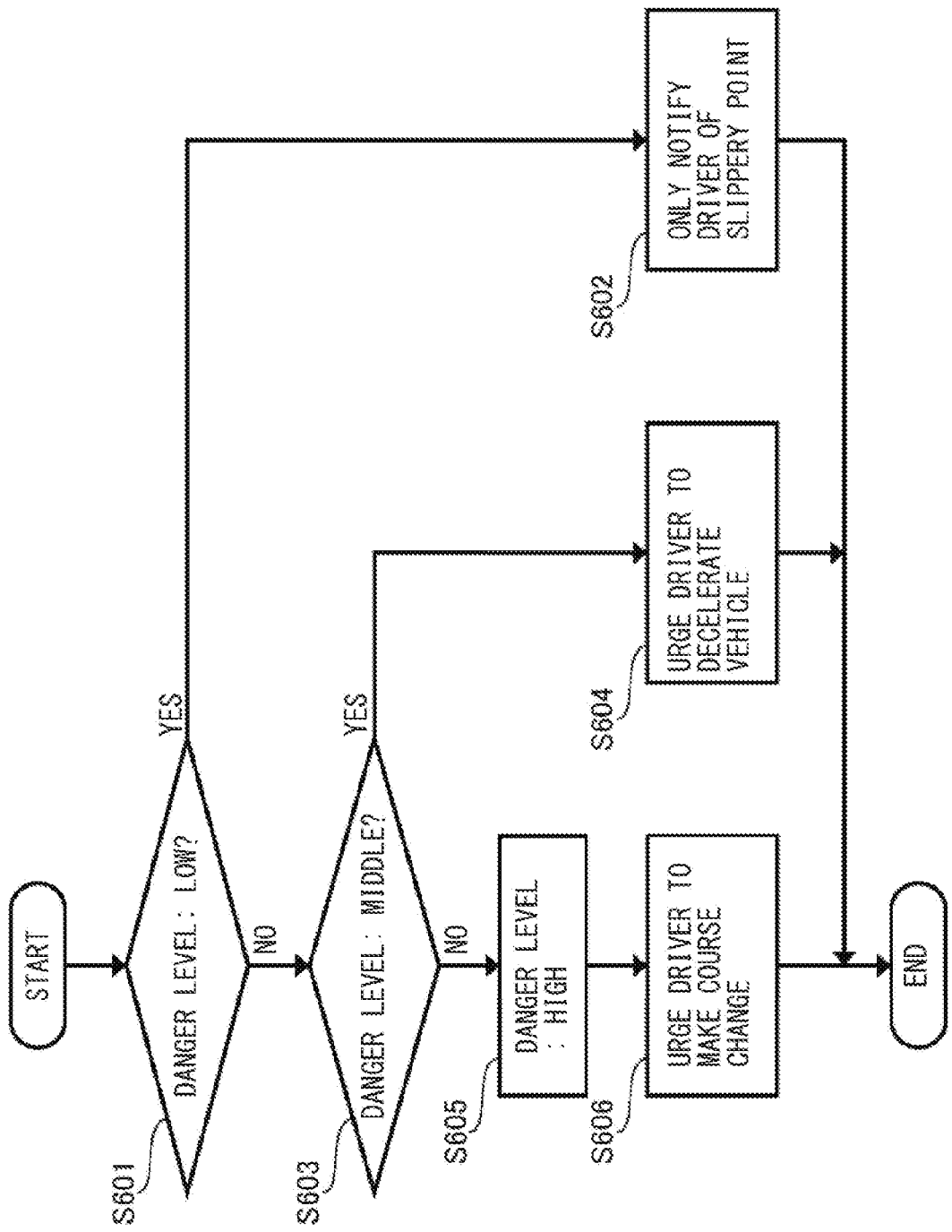
FIG. 8 is a flowchart illustrating an exemplary flow of notification processing performed by the vehicle control apparatus according to one example embodiment of the technology in accordance with the drive assistance information.

As illustrated in FIG. 8, the vehicle control apparatus 21 may notify the driver of the drive assistance information in accordance with the danger level. For example, if the danger level is "low" (Step S601: YES), the notification control unit 250 may notify the driver of the presence of the slippery point in the traveling direction (Step S602). That is, the notification control unit 250 may cause the display unit 441 to display the slippery point or display the slippery point on the risk map with emphasis.

If the danger level is "middle" (Step S603: YES), the notification control unit 250 may urge the driver to perform deceleration of the vehicle 2 as the danger avoidance operation, and notify the driver of the distance to the slippery point, for example (Step S604).

If the danger level is "high" (Step S605: YES), the notification control unit 250 may urge the driver to make a traveling course change as the danger avoidance operation, and cause the notification unit 44 to notify the driver of the distance to the slippery point, the estimated arrival time to the slippery point, the range of the slippery point, and other pieces of information about the slippery point (Step S606).

As described above, when idling of a wheel of the vehicle is detected while the vehicle is traveling, the road surface information providing apparatus according to the example embodiments described above acquires the vehicle information from the vehicle to receive the information about the slippery point on the road surface. The road surface information providing apparatus collects the vehicle information from a plurality of vehicles to thereby compile the information about the slippery point, and acquire the weather information on the surrounding areas around the vehicles, to thereby accurately estimate the road surface condition.

Further, the road surface information providing apparatus generates the risk map including the map information correlated with the road surface information indicating the estimated condition of the road surface. This risk map allows the driver to intuitively recognize the slippery point, to thereby assist the driver in controlling the vehicle in accordance with the road surface condition.

When receiving the risk map, the vehicle may cause the display provided in the vehicle to display the risk map. If there is a slippery region on the road surface on which the vehicle is traveling or an adjacent road surface, the slippery region may be displayed on the map to notify the driver of the presence of the slippery region.

By determining the danger level for each vehicle on the basis of the risk map, it is possible to provide the danger avoidance operation suitable for the vehicle. Accordingly, it is possible to perform appropriate assistance in drive controlling on the basis of a road surface condition.

Although some example embodiments of the technology have been described in detail with reference to the drawings, specific configurations of the technology should not be limited to those in these example embodiments and may be modified in a range without departing from the gist of the technology. It is to be appreciated that these modifications are included as part of the technology. Further, the example embodiments described above may be combined with each other unless there is a particular contradiction or problem in purpose, configuration, or other aspects.

According to the road surface information providing apparatus and the vehicle control apparatus of the example embodiments of the technology described above, it is possible to estimate detailed conditions of each road surface to assist a driving operation in accordance with a road surface condition and achieve appropriate assistance to vehicle control.

At least one of the communication unit 31, the information acquisition unit 32, the road surface condition estimation unit 33, or the risk map generation unit 34 in the road surface information providing apparatus 3 in FIG. 1 or at least one of the risk map acquisition unit 230, the danger level acquisition unit 240, or the notification control unit 250 in the vehicle control apparatus 21 in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the communication unit 31, the information acquisition unit 32, the road surface condition estimation unit 33, the risk map generation unit 34, the risk map acquisition unit 230, the danger level acquisition unit 240, and the notification control unit 250. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the communication unit 31, the information acquisition unit 32, the road surface condition estimation unit 33, the risk map generation unit 34, the risk map acquisition unit 230, the danger level acquisition unit 240, and the notification control unit 250.

The invention claimed is:

1. A road surface information providing apparatus comprising a processor configured to:
   acquire vehicle information from a first vehicle with a wheel detected as being idling, the vehicle information including a position information indicating a position at which an idling of the wheel is detected;
   determine the position indicated by the position information as a slippery point;
   determine that a second vehicle travels within a predetermined region that includes the slippery point;
   in response to determining that the second vehicle travels within the predetermined region, determine whether the slippery point is ahead of the second vehicle in a traveling direction of the second vehicle;
   in response to determining that the slippery point is not ahead of the second vehicle in the traveling direction of the second vehicle, determine that a danger level for the second vehicle is a first level;
   in response to determining that the slippery point is ahead of the second vehicle in the traveling direction of the second vehicle, determine whether a distance between the second vehicle and the slippery point is less than a predetermined distance;
   in response to determining that the distance between the second vehicle and the slippery point is less than the predetermined distance, determine that the danger level is a second level;
   in response to determining that the distance between the second vehicle and the slippery point is greater than or equal to the predetermined distance, determine whether the number of vehicles that have slipped at the slippery point is greater than or equal to a predetermined value;
   in response to determining that the number of vehicles that have slipped at the slippery point is less than the predetermined value, determine that the danger level for the second vehicle is the second level;
   in response to determining that the number of vehicles that have slipped at the slippery point is greater than or equal to the predetermined value, determine that the danger level for the second vehicle is a third level;
   in response to determining that the danger level for the second vehicle is the first level, transmit the danger level to the second vehicle to control a display of the second vehicle to display that the slippery point is present;
   in response to determining that the danger level for the second vehicle is the second level, transmit the danger level to the second vehicle (1) to control the display of the second vehicle to display that the slippery point is present, and (2) to control a speaker of the second vehicle to output an alarm; and
   in response to determining that the danger level for the second vehicle is the third level, transmit the danger level to the second vehicle (1) to control the display of the second vehicle to display that the slippery point is present, (2) to control the speaker of the second vehicle to output the alarm, and (3) to control a vibrator of the second vehicle to vibrate a driver's seat of the second vehicle.

2. A vehicle comprising:
   wheel speed sensors attached to wheels of the vehicle, respectively;
   a display;
   a speaker;
   a vibrator configured to vibrate a driver's seat; and
   circuitry configured to:
      monitor revolution speeds of the wheels or revolution numbers of the wheels based on outputs from the wheel speed sensors;
      detect idling of one of the wheels based on the revolution speeds of the wheels or the revolution numbers of the wheels;
      in response to detection of the idling of the one of the wheels, acquire vehicle information, the vehicle information including position information, the position information indicating a traveling position of the vehicle when the idling of the one of the wheels is detected;
      in response to acquisition of the vehicle information, send the vehicle information to an external server, the external server being configured to generate a danger level for the vehicle based on the vehicle information, the danger level being information indicating one of a first level, a second level, and a third level;
      in response to receiving the danger level from the external server, determine whether the danger level indicates one of the first level, the second level, and the third level;
      in response to determining that the danger level indicates the first level, control the display to display that a slippery point is present;
      in response to determining that the danger level indicates the second level, (1) control the display to display that the slippery point is present, and (2) control the speaker to output an alarm; and
      in response to determining that the danger level indicates the third level, (1) control the display to display that the slippery point is present, (2) control the speaker to output the alarm, and (3) control the vibrator to vibrate the driver's seat.

* * * * *